Aug. 23, 1932.  W. E. HOKE  1,873,647
SYSTEM OF LAPPING TAPER ROLLERS
Filed June 23, 1931   2 Sheets-Sheet 1

INVENTOR
Wm. E. Hoke
BY
ATTORNEY.

Aug. 23, 1932.  W. E. HOKE  1,873,647

SYSTEM OF LAPPING TAPER ROLLERS

Filed June 23, 1931 2 Sheets-Sheet 2

INVENTOR
Wm E. Hoke
BY Joseph K. Schofield
ATTORNEY.

Patented Aug. 23, 1932

1,873,647

UNITED STATES PATENT OFFICE

WILLIAM E. HOKE, OF BALTIMORE, MARYLAND

SYSTEM OF LAPPING TAPER ROLLERS

Application filed June 23, 1931. Serial No. 546,199.

This invention relates to lapping taper rollers such as are commonly employed in antifriction bearings. More particularly the invention relates to devices for and methods of lapping the surfaces of revolution and preferably also the base surfaces at one end of taper rollers to extreme precision and identity.

A primary object of the invention is to provide a device for properly supporting a plurality of tapered rollers closely adjacent each other between members having respectively internal and external conical surfaces, so that the rollers may be traversed longitudinally during rotation of one of the members having a conical surface, one or both of the conical surfaces being charged with a suitable compound to effect an abrasive or lapping operation.

Another object of importance is that means are provided for effecting reciprocatory movements of the rollers along the elements of the conical members to effect the lapping operation upon the surfaces of revolution of the rollers, this movement taking place simultaneously with rotary movement of one of the members and while the members may angularly adjust themselves floatingly relative to the rollers.

Another object of the invention is to provide a member having a conical surface adapted to engage the base surfaces of the series of rollers being lapped, the rollers being simultaneously rotated about their axes and simultaneously revolved about the axis of the members supporting the rollers so that the base surfaces are lapped uniformly to a portion of a spherical surface during the lapping of their conical surfaces.

And finally it is an object to provide a device and method whereby tapered rollers may be lapped upon their surfaces of revolution and upon their base surfaces efficiently and to extremely close identity, for this purpose the rollers being arranged in a generally circular or annular series for convenient transposition or symmetrical distribution between successive periods of lapping operations.

With the above and other objects in view my invention consists in the features of construction and operation set forth in the following specification and illustrated in the accompanying drawings.

In the accompanying drawings annexed hereto and forming a part of this specification, I have shown my invention embodied in different forms of lapping devices for tapered rollers primarily designed for antifriction bearings of well-known type but it will be understood that the invention can be otherwise embodied and that the drawings are not to be construed as defining or limiting the scope of the invention, the claims appended to this specification being relied upon for that purpose.

In the above mentioned drawings, I have shown several embodiments of the invention which are now deemed preferable, but it is to be understood that changes and modifications may be made within the scope of the appended claims without departing from the spirit of the invention.

In the efficient production of antifriction bearings of the tapered roller type it is one essential for quiet and efficient operation that the rollers be of identical form. Not only must the rollers have exactly the same taper upon their surfaces of revolution determined by the members with which they cooperate but also the maximum diameter of and the curvature of the base surface must be identical for all the rollers in any one bearing. This is for the reason that in operation the rollers are forced in a direction to engage their larger or base ends with a portion of one of the bearing members. Unless the rollers are identical the smaller ones will not bear their proportionate share of the load placed upon the bearing. The load will therefore be unsymmetrically distributed among the other rollers unduly stressing them and causing more rapid wear of the bearing.

Briefly, and in its preferred aspect, my invention may include the following principal parts for effecting simultaneous lapping operations upon the surfaces of frustums or rollers: First, cooperating members having respectively internal and external conical surfaces, the difference between the apex angles of these surfaces being such that the tapered rollers may be accommodated therebetween; second, another member preferably having a conical surface against which the bases of the rollers contact; and third, means to rotate and actuate one or more of the members to effect lapping operations upon the surfaces of revolution or base surfaces of the rollers or to effect lapping operations upon both surfaces simultaneously.

Figure 1:
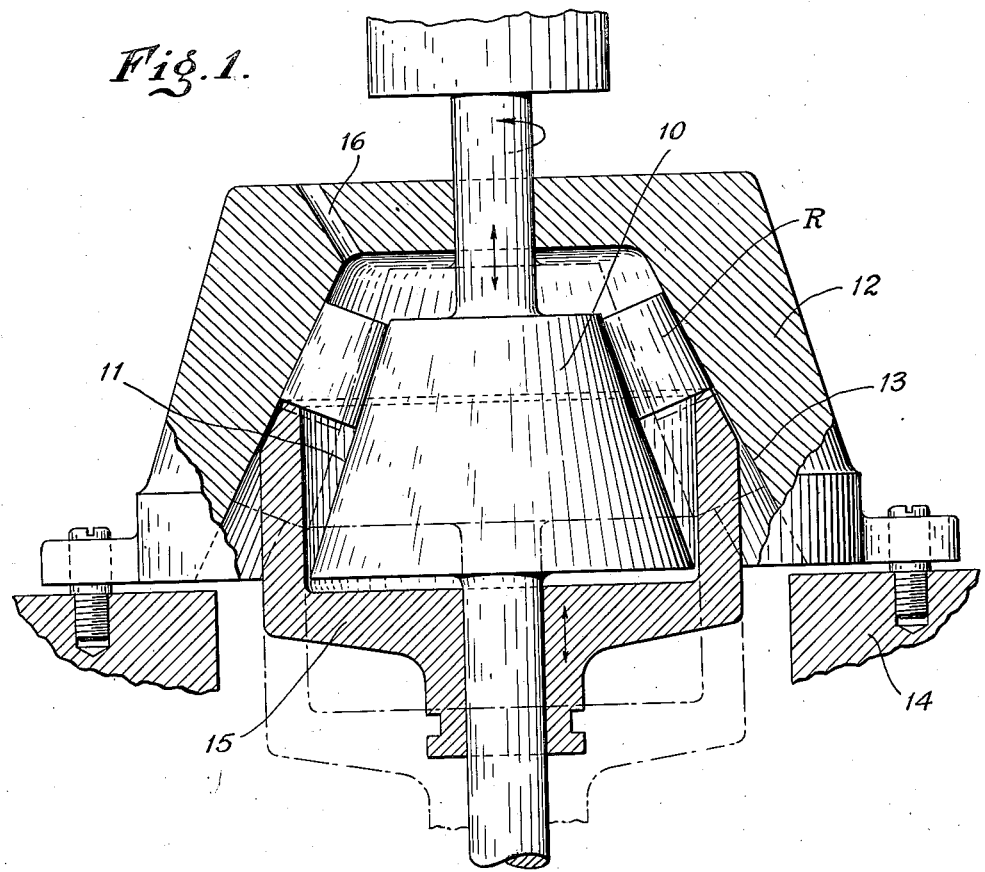
Figure 1 is a longitudinal sectional view of one form of the invention for lapping the surfaces of revolution and base surfaces of a plurality of frustums.

Referring more in detail to the figures of the drawings, and first with reference to Fig. 1, I provide a member 10 having an external conical surface 11 adapted to be rotated upon its axis by any preferred means (not shown). This member 10 may be enclosed or surrounded by a member 12 having an internal conical surface 13. This member 12 may be held against rotation upon a suitable support in any preferred manner and rest upon the rollers R being lapped. The member 12 may preferably rest when not in operation upon a platform 14 in which studs are provided entering recesses in the flange of member 12 to prevent rotation. In operation the member 10 is maintained in the position shown in Fig. 1 which holds the member 12 above its support and causes the member 12 to rest freely and floatably upon the rollers R with its entire weight. An annular member 15 may be slidably mounted for movement axially upon the shank of the rotating member 10 and has its upper end of ring form and bevelled so that it is adapted to engage the bases or end surfaces of the rollers R. By reciprocating this member 15 during rotation of the member 10 by any suitable means the rollers R are caused to traverse the lapping surface or surfaces by means of which the surfaces of revolution of the rollers R and their base surfaces are simultaneously finished accurately and to a high polish.

The lapping compound may be admitted in fluid form through suitable openings 16 or by any other suitable manner by which it may spread over the rollers R and on to the conical surfaces 11 and 13 and upon the end surface of the member 15. By the combined movement of rotation and revolution imparted to the rollers R and their axial movement by reciprocation of the member 15 the surfaces of revolution and also the base surfaces of the rollers are simultaneously lapped. The greatest lapping effect will be concentrated upon the larger of the rollers so that each will be brought more closely to uniformity.

Figure 2:
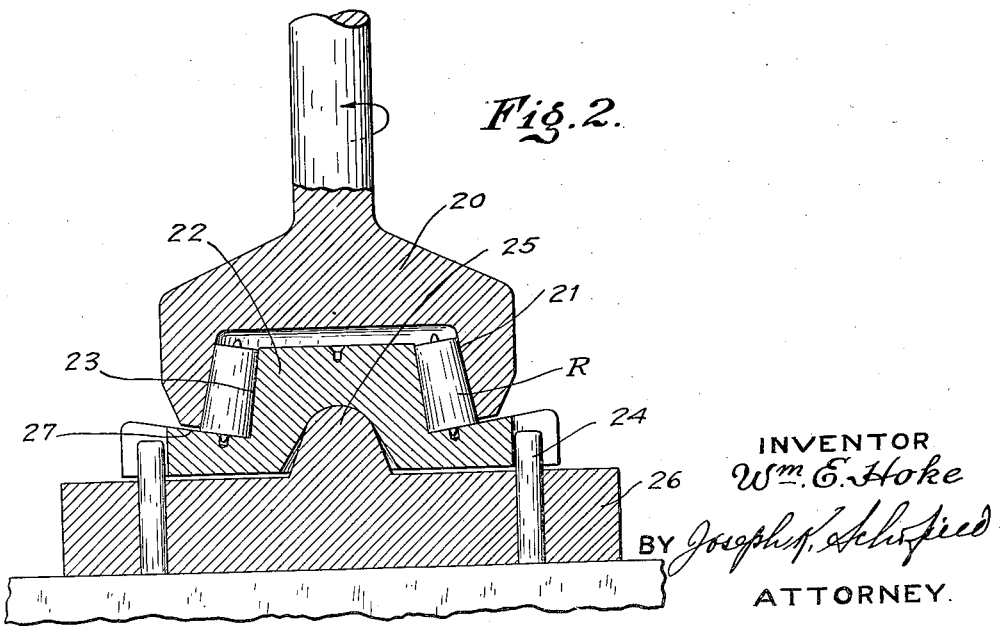
Fig. 2 is a similar view of another form of the invention for effecting lapping operations upon the base surfaces only of conical frustums, one of the members supporting the frustums being provided with a conical surface and being mounted for free movement in any direction about a ball and socket joint.

Referring to Fig. 2 there is provided a rotating member 20 having an internal conical surface 21 against which a plurality of annularly arranged rollers R are maintained by a cooperating member 22 having an external conical surface 23. This latter member 22 is maintained against rotation as by the studs 24 outstanding from a support 26 while the member 20 having the internal conical surface 21 is rotated by any preferred means. The member 22 is mounted upon a rounded projection 25 on support 26 and enters a recessed portion so that it may adjust itself angularly to accommodate itself to the rollers R being operated on. By rotation of the member 20 and with lapping compound supplied to the rollers R their base surfaces will be in position between the surfaces 21 and 23. The weight of the member 20 and the tapered form of the rollers R force them against the lapping surface 27 of the member 22. The lapping operation is therefore concentrated upon the larger rollers, the smaller ones merely resting upon surface 27.

Figure 3:
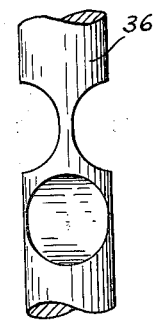
Fig. 3 is a longitudinal view of a third form of the invention particularly adapted for lapping the base surfaces only of the frustums.

In Fig. 3 is shown a device particularly adapted for simultaneously lapping the bases or end surfaces of a number of rollers together with their surfaces of revolution in a manner assuring extreme precision. The lapping of the end surfaces is effected by their engagement with the internal conical surface 30 of a member 31 so mounted that it may have limited axial movement and adjustability and which may also be rotated. The rollers R having their conical surfaces and end faces lapped are maintained in proper position relative to the lapping surface 30 by being disposed between internal and external conical surfaces 32 and 33 of relatively adjustable members 34 and 35. These conical surfaces 32 and 33 contact with the surfaces of revolution of the rollers R which tend by reason of the weight of the upper member 34 to force the rollers R against the conical lapping surface 30. If desired the lapping may be confined to the end faces, the surfaces 32 and 33 being employed only for retaining the rollers in proper position.

The upper member 34 having the internal conical surface 32 may be rotated instead of the member 31 if desired by any known or preferred means. Preferably and as shown in this figure the shank 36 of the upper rotating member 34 may be reduced in cross section at several places so that it may be somewhat flexible. By means of this flexibility the rotating member 34 will always adjust itself to the surfaces of the rollers R. Similarly the member 35 may be mounted for universal movement upon the upper end of its fixed support 37.

The member 31 having the lapping surface 30 may be reciprocated in a direction toward and from the upper member 34, the members 34 and 35 slightly separating to permit this movement. This causes the rollers R to be forced back and forth within the space between the supporting members 31 and 34 to effect lapping operations upon their surfaces of revolution. This movement further serves to increase the operative area of the surface 30 engaged by the end surfaces of the rollers being lapped. As the rollers are rotated upon their individual axes simultaneously with their revolving movement about the axis of the supporting members 31 and 34 the base surfaces of the rollers are lapped to portions of spherical surfaces.

Figure 4:
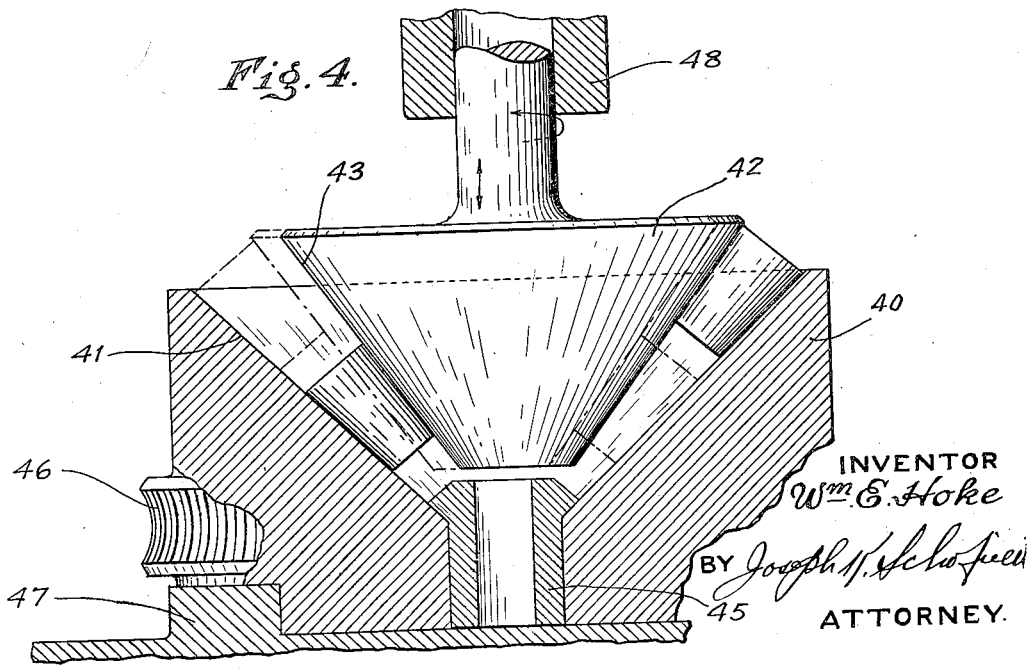
Fig. 4 is a longitudinal sectional view of a form of the invention for lapping the surfaces of revolution in which the lapping members are disposed eccentrically to each other.

Figure 4 shows a form of the invention in which the axis of a base member 40 having an internal conical surface 41 is disposed slightly eccentric to a member 42 having an external conical surface 43. One or the other of these members, preferably 42, is rotated and permitted to move axially by its being mounted within a bearing member 48. The rotative movement about its fixed axis effects the lapping operation. The rollers R having their surfaces of revolution lapped are disposed between the conical surfaces 41 and 43. It will be understood that the angles of these conical surfaces will be such that the space between them will properly accommodate the particular rollers being lapped.

With the members 40 and 42 disposed as shown and with the rollers R therebetween one lapping member may be rotated at a relatively high speed. The effect of this rotation is to rotate and revolve the rollers R and, due to the eccentricity of the lapping members 40 and 42 and the difference in width of the space between them on opposite sides, the rollers R will be forced to slide outwardly of the lapping members on one side and will fall into the space on the opposite side. This movement outwardly and inwardly along elements of the conical surfaces which are charged with an abrasive or lapping compound effects the lapping operation upon the rollers. The base member 40 may be slowly rotated about the axis of its conical surface 41. For this purpose the member 40 may be rotatably supported within a member 47 and provided with a worm gear 46 or other form of rotating means. Fitting within the member 40 at the lower portion of the surface 41 is a stop member 45 preventing the rollers R from dropping below the active lapping surface 43 of the member 42. By reason of the rotation of the lower member 40 the total area of surface 41 is made use of for the lapping operation.

Figure 5:
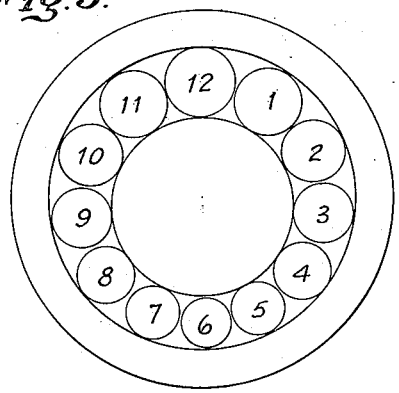
Figs. 5 and 6 are diagrammatic views showing a projection of the rollers or frustums disposed between supporting and lapping members before and after having been symmetrically redistributed.
Figure 6:
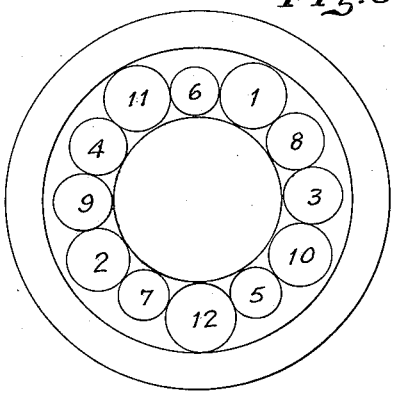

In all of the above forms of the invention the rollers being operated on are in annular groups. By reason of this arrangement it is possible to periodically redistribute the rollers symmetrically within the groups to attain maximum precision. A method is shown diagrammatically in Figs. 5 and 6 for accomplishing this symmetrical redistribution in a simple manner. It may be assumed that before starting the lapping operation upon the rollers they are of slightly varying sizes, the sizes varying irregularly about the group. After a period of lapping they may be brought down to a condition wherein all will contact with the lapping surfaces. This condition may be fulfilled when the rollers vary in size successively as shown (somewhat exaggerated) in Fig. 5. Continuing the lapping operations with this arrangement would reduce the rollers equally but would not make them any more nearly identical. If, however, we transpose alternate rollers to diametrically opposite positions the rollers when rearranged will be disposed somewhat as shown in Fig. 6. As thus rearranged the lapping surfaces only contact with and effect lapping operations upon those rollers of larger size. A period of lapping with the group rearranged will therefore bring the rollers more nearly to uniformity. Repeated redistributing and lapping operations may be alternated until the rollers reach a predetermined size and each is identical to the others.

What I claim is:

1. A lapping device for tapered rollers comprising in combination, a member having an internal conical surface, a member having an external conical surface, said members being adjustable angularly relatively to each other, means to retain a series of rollers closely adjacent each other between said conical surfaces and with their axes in a cone co-axial with the conical surfaces of said members, and means to effect lapping movements of said rollers relative to said members.

2. A lapping device for tapered rollers comprising in combination, a member having an internal conical surface, a member having an external conical surface co-axial therewith, means permitting angular adjustment of one of said members relatively to the other, means to rotate one of said members, and means to retain and move axially a series of rollers between said members.

3. A lapping device for tapered rollers comprising in combination, a member having an internal conical surface, a member having an external conical surface, said members being adjustable angularly relatively to each other, means to retain an annular group of rollers closely adjacent each other between said surfaces, means to rotate one of said members, and means to induce lapping movements of said rollers relative to said members.

4. A lapping device for tapered rollers comprising in combination, a member having an internal conical surface, a member having an external conical surface, said members being adjustable angularly relatively to each other, an annular series of closely adjacent rollers between and contacting with said surfaces, means to rotate one of said members whereby said rollers are rotated about their axes and are revolved about the axis of said members, a member constantly engaging the base surfaces of said rollers, and means to actuate said latter member to force said rollers axially between said conical surfaces during their rotative and revolving movements.

5. A lapping device for tapered rollers comprising in combination, a member having an internal conical surface, a member having an external conical surface, said members being floating adjustable, an annular series of rollers disposed between said surfaces closely adjacent each other and having the weight of one of said members resting freely upon them, means to rotate one of said members, and means to force said rollers axially along said conical surfaces during said rotation to effect lapping operations thereon.

6. A lapping device for tapered rollers comprising in combination, a member having an internal conical surface, a member having an external conical surface, an annular series of rollers disposed between said conical surfaces, and means to rotate one of said members so that its conical surface has its axis parallel but eccentric to the axis of the opposed conical surface whereby said rollers will be rotated and revolved about said member and traversed axially along elements of said conical surfaces.

7. The process of lapping the surfaces of revolution and base surfaces of tapered rollers comprising rotating and revolving said rollers while arranged closely together in an annular series between angularly adjustable members having conical surfaces engaging said rollers, and axially moving said rollers relative to said members to effect lapping operations thereon.

8. The process of lapping tapered rollers to high precision and identity comprising rotating and revolving said rollers in an annular series while maintained closely adjacent each other between supporting members having conical surfaces engaging said rollers and floatably connected, axially moving said rollers relative to said members to effect lapping operations, transposing said rollers systematically within said series, and repeating the lapping operation upon said rollers.

9. The process of simultaneously lapping the surfaces of revolution and base surfaces of tapered rollers to high precision comprising rotating and revolving said rollers in an annular series between three members having conical surfaces, two of which are floatably connected, moving one of said members for effecting lapping movements of said rollers relative to said surfaces, diametrically transposing alternate rollers, and repeating the lapping movements of said rollers.

In testimony whereof, I hereto affix my signature.

WILLIAM E. HOKE.